United States Patent
Araki et al.

(10) Patent No.: US 11,940,647 B2
(45) Date of Patent: Mar. 26, 2024

(54) OPTICAL SYSTEM

(71) Applicant: Panasonic Intellectual Property Management Co., Ltd., Osaka (JP)

(72) Inventors: Yosuke Araki, Osaka (JP); Wahei Agemizu, Osaka (JP); Kazumasa Takata, Osaka (JP); Masaru Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/363,188

(22) Filed: Aug. 1, 2023

(65) Prior Publication Data

US 2023/0375770 A1    Nov. 23, 2023

Related U.S. Application Data

(63) Continuation of application No. PCT/JP2021/045821, filed on Dec. 13, 2021.

(30) Foreign Application Priority Data

Feb. 17, 2021   (JP) ................................. 2021-023332

(51) Int. Cl.
    *F21V 8/00*    (2006.01)
(52) U.S. Cl.
    CPC ......... *G02B 6/0046* (2013.01); *G02B 6/0038* (2013.01)
(58) Field of Classification Search
    CPC .. G02B 6/0038; G02B 6/0045; G02B 6/0046; G02B 6/0013; G02B 6/0016;
    (Continued)

(56) References Cited

U.S. PATENT DOCUMENTS

| 4,737,896 A * | 4/1988 | Mochizuki | G02B 6/0068 |
| | | | 362/335 |
| 2008/0231772 A1* | 9/2008 | Hung | F21V 7/0091 |
| | | | 362/616 |

(Continued)

FOREIGN PATENT DOCUMENTS

| AU | 2014233650 | 10/2014 |
| JP | 2007-266242 | 10/2007 |

(Continued)

OTHER PUBLICATIONS

International Search Report of PCT application No. PCT/JP2021/045821 dated Feb. 15, 2022.

*Primary Examiner* — Fatima N Farokhrooz
(74) *Attorney, Agent, or Firm* — Wenderoth, Lind & Ponack, L.L.P.

(57) ABSTRACT

Light control body (6) has first incident surface (7) and first reflection surface (9). First incident surface (7) condenses part of light emitted from light source (1) and emits the light toward incident surface (3) of light guide plate (2). First reflection surface (9) reflects the light that is emitted from light source (1) and does not pass through first incident surface (7), and emits the light toward incident surface (3) of light guide plate (2). First focal position (11) of first incident surface (7) and second focal position (12) of first reflection surface (9) are set at positions that are different from each other and away from the light emission surface of light source (1).

6 Claims, 7 Drawing Sheets

(58) Field of Classification Search
CPC .... G02B 6/0018; G02B 6/002; G02B 6/0021; G02B 6/0028; G02B 6/0033; G02B 6/0035; G02B 6/0036
See application file for complete search history.

(56) References Cited

U.S. PATENT DOCUMENTS

| | | | |
|---|---|---|---|
| 2009/0231846 A1* | 9/2009 | Nakajima | G02B 6/003 362/237 |
| 2010/0053992 A1* | 3/2010 | Krijn | G02B 6/0068 362/609 |
| 2015/0085530 A1* | 3/2015 | Fujita | G02B 6/0053 362/626 |
| 2018/0101087 A1* | 4/2018 | Shinohara | G02B 6/00 |
| 2019/0257491 A1* | 8/2019 | O | F21S 43/237 |
| 2022/0043262 A1 | 2/2022 | Agemizu et al. | |

FOREIGN PATENT DOCUMENTS

| | | |
|---|---|---|
| JP | 2013-024966 | 2/2013 |
| JP | 2020-183979 | 11/2020 |
| WO | 2013/168392 | 11/2013 |
| WO | 2020/218375 | 10/2020 |

* cited by examiner

SHIFT AMOUNT OF FIRST FOCAL POSITION [mm]

FIG. 10

OPTICAL SYSTEM

TECHNICAL FIELD

The present disclosure relates to an optical system.

BACKGROUND ART

PTL 1 discloses an image display that projects a virtual image into a target space. This image display is a head-up display (HUD) for an automobile. Projection light that is image light and is emitted from an on-vehicle HUD (optical system) in a dashboard is reflected by a windshield and is directed to a driver who is a viewer.

As a result, the user (driver) can visually recognize an image such as a navigation image as a virtual image, and can visually recognize the image as if the virtual image is superimposed on a background such as a road surface.

CITATION LIST

Patent Literature

PTL 1: Unexamined Japanese Patent Publication No. 2020-183979

SUMMARY OF THE INVENTION

An aspect of the present invention is an optical system, including: a light source that emits light; a light guide plate, the light guide plate including: an incident surface that the light emitted from the light source is incident on, and a first surface and a second surface that face each other, the second surface being a light exit surface; and a light control body that condenses light directed to the incident surface and emits the condensed light toward the incident surface. The first surface is provided with a prism that reflects light passing through an inside of the light guide plate, toward the second surface. The light control body includes: a first incident surface that condenses part of the light emitted from the light source and emits the part of the light toward the incident surface; and a first reflection surface that reflects and emits, toward the incident surface, light emitted from the light source and not passing through the first incident surface. The first incident surface has a first focal position where parallel light converges at one point when the parallel light is incident on the first incident surface of the light control body from the incident surface of the light guide plate. The first reflection surface has a second focal position where parallel light converges at one point when the parallel light is incident on the first reflection surface of the light control body from the incident surface of the light guide plate. The first focal position and the second focal position are at positions that are different from each other and away from a light emission surface of the light source.

DESCRIPTION OF EMBODIMENT

In the optical system described in PTL 1, a focal position of a refractive surface and a focal position of a total reflection surface in a light control body coincide with each other. Therefore, when the size of a light source is larger than a certain size with respect to the size of a light guide plate, light emitted from an end part of a light emission surface of the light source cannot be effectively controlled, and efficiency of light extraction by prisms can be reduced.

Here, it is conceivable to take measures by bringing the light source closer to the light guide plate. However, in a case where the light guide plate is made of resin, the light guide plate may be melted by heat of the light source, and the light source cannot be brought closer to the light guide plate by a certain distance or more.

An object of the present invention is to provide an optical system capable of improving light extraction efficiency.

Hereinafter, an exemplary embodiment of the present invention will be described with reference to the drawings. The present invention is not limited to the following exemplary embodiment. Further, the present invention can be appropriately modified without departing from the scope that provides the effect of the present invention.

Figure 1:
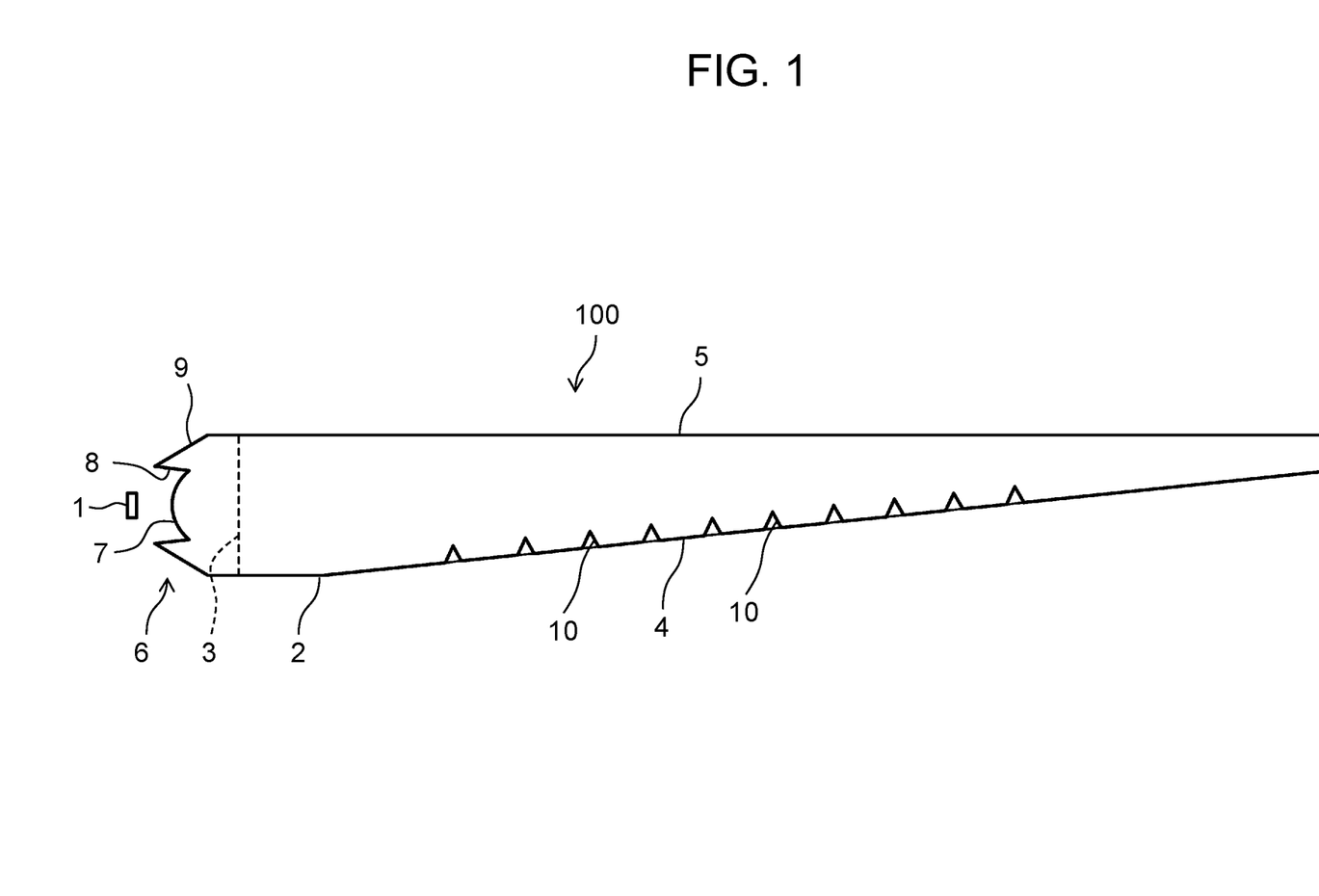
FIG. 1 is a sectional view illustrating an outline of an optical system according to the present embodiment.

As illustrated in FIG. 1, optical system 100 includes light source 1, light guide plate 2, and light control body 6.

Light source 1 includes, for example, a solid-state light emitting element such as a light emitting diode (LED) element or an organic electro-luminescence (OEL) element. Although not illustrated, a plurality of light sources 1 are provided at intervals in the depth direction of the paper surface of FIG. 1.

Light guide plate 2 is disposed to face the light emission surfaces of light sources 1. Light guide plate 2 is made of a transparent resin material formed in a flat plate shape. Light guide plate 2 is made of, for example, polypropylene, polyethylene, polyethylene terephthalate, polyvinyl chloride, acrylonitrile butadiene styrene (ABS) resin, acrylic, polyamide, polycarbonate, Teflon (registered trademark), or the like.

Light guide plate 2 has incident surface 3 on which light is incident, and has first surface 4 and second surface 5 facing each other. Incident surface 3 is formed on one of four side surfaces of light guide plate 2. First surface 4 and second surface 5 are provided on two surfaces facing each other in the thickness direction of light guide plate 2.

A plurality of prisms 10 are provided on first surface 4. Prisms 10 reflect light passing through the inside of light guide plate 2, toward second surface 5. Prisms 10 are configured to totally reflect incident light. Note that prisms 10 are not limited to an aspect in which all incident light is totally reflected, and may include an aspect in which some light is not totally reflected but passes through prisms 10.

First surface 4 is not orthogonal to incident surface 3 but inclined by a predetermined angle. Specifically, first surface 4 is inclined so as to be closer to second surface 5 at a position that is more distant from the incident surface 3.

Second surface 5 is a light exit surface. Second surface 5 is orthogonal to incident surface 3. Light guide plate 2 is configured in such a manner that light is incident from incident surface 3 of the side surface so as to cause second surface 5, which is an exit surface, to surface-emit light.

Light control body 6 is disposed closer to light source 1 than incident surface 3 of light guide plate 2 is. Light control body 6 is formed integrally with light guide plate 2. Although not illustrated, a plurality of light control bodies 6 are provided at intervals in the depth direction of the paper surface of FIG. 1. The plurality of light control bodies 6 are provided at positions facing respective ones of the plurality of light sources 1.

Each light control body 6 is, for example, a collimator lens, and condenses light directed to incident surface 3 and emits the condensed light toward incident surface 3. Each light control body 6 includes first incident surface 7, second incident surface 8, and first reflection surface 9.

First incident surface 7 refracts part of the light emitted from light source 1 and emits the refracted light toward incident surface 3. The light that is emitted from light source 1 and does not pass through first incident surface 7 is incident on second incident surface 8. First reflection surface 9 totally reflects the light having passed through second incident surface 8 and guides the totally reflected light to incident surface 3.

Light control body 6 controls to narrow the divergence angle of the light emitted from light source 1 by refracting part or all of the light emitted from light source 1, and emits the light toward incident surface 3. Light control body 6 controls the divergence angle of the light incident on light control body 6 such that the optical path of the light emitted toward incident surface 3 becomes close the optical path parallel to second surface 5. In light guide plate 2, most of the light incident from incident surface 3 is reflected by prisms 10 and emitted from second surface 5.

As described above, in the present embodiment, the light whose divergence angle is controlled through light control body 6 is directly reflected by prisms 10 provided on first surface 4 of light guide plate 2 and is emitted from second surface 5.

Therefore, in the present embodiment, the light extraction efficiency can be improved as compared with an aspect in which the light is emitted from second surface 5 while repeating total reflection on first surface 4 and second surface 5 of light guide plate 2. The "extraction efficiency" in the present embodiment refers to a ratio of the amount of light emitted from second surface 5 (exit surface) of light guide plate 2 to the amount of light incident on incident surface 3 of light guide plate 2.

By the way, when the size of light source 1 is larger than a certain size with respect to the size of light guide plate 2, the light emitted from the end part of the light emission surface of light source 1 cannot be effectively controlled, and the efficiency of light extraction by prisms 10 can be reduced.

Therefore, in the present embodiment, the light extraction efficiency is improved by appropriately setting the focal positions of first incident surface 7 and first reflection surface 9 and the dimensions of each part of light control body 6.

Figure 2:
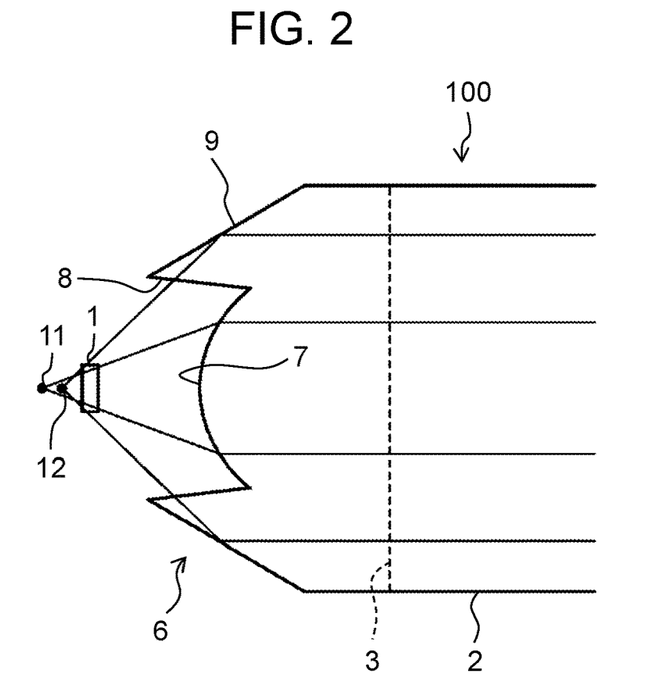
FIG. 2 is a sectional view illustrating a positional relationship between a first focal position of a first incident surface and a second focal position of a first reflection surface.

Specifically, as illustrated in FIG. 2, first focal position 11 of first incident surface 7 and second focal position 12 of first reflection surface 9 are set at positions that are different from each other and away from the light emission surface of light source 1.

First focal position 11 of first incident surface 7 is a position where parallel light converges at one point when the parallel light is incident on first incident surface 7 of light control body 6 from incident surface 3 of light guide plate 2. Second focal position 12 of first reflection surface 9 is a position where parallel light converges at one point when the parallel light is incident on first reflection surface 9 of light control body 6 from incident surface 3 of light guide plate 2.

As described above, by setting first focal position 11 and second focal position 12 at different positions, it is possible to efficiently emit the light emitted from the end part of the light emission surface of light source 1, toward first surface 4 of light guide plate 2. As a result, it is possible to improve light utilization efficiency of light guide plate 2.

Figure 3:
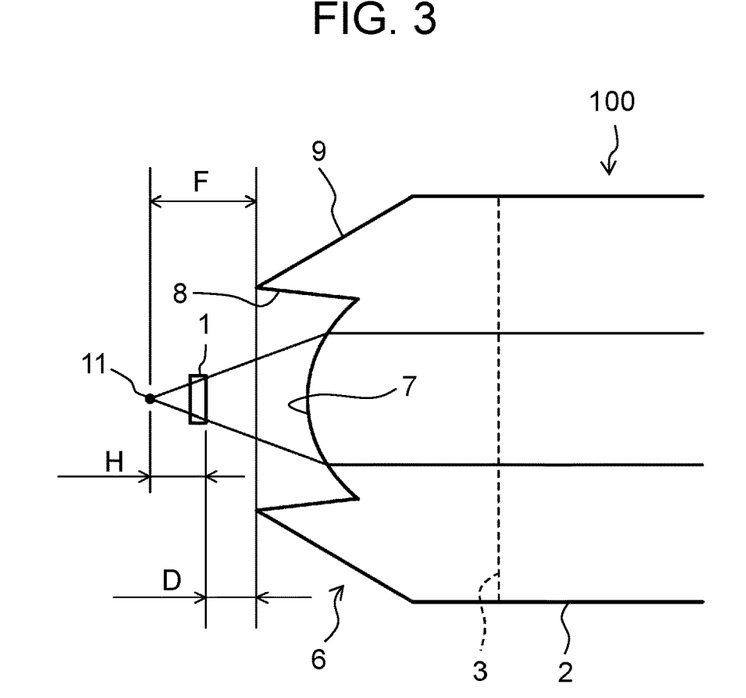
FIG. 3 is a sectional view illustrating a positional relationship between the first focal position of the first incident surface and a light source.

FIG. 3 is a sectional view illustrating a positional relationship between the first focal position of the first incident surface and the light source. As illustrated in FIG. 3, F denotes a distance from the portion of light control body 6 closest to light source 1 to first focal position 11 of first incident surface 7. Further, D denotes a distance from the portion of light control body 6 closest to light source 1 to the light emission surface of light source 1.

Here, in order to effectively use the light emitted from the end part of the light emission surface of light source 1, it is necessary to reduce an influence of the size of light source 1 by making the distance F larger than the distance D. Therefore, the distance F and the distance D are set so as to satisfy the following Expression (1).

$$D \leq F \qquad \text{Expression (1)}$$

Figure 4:
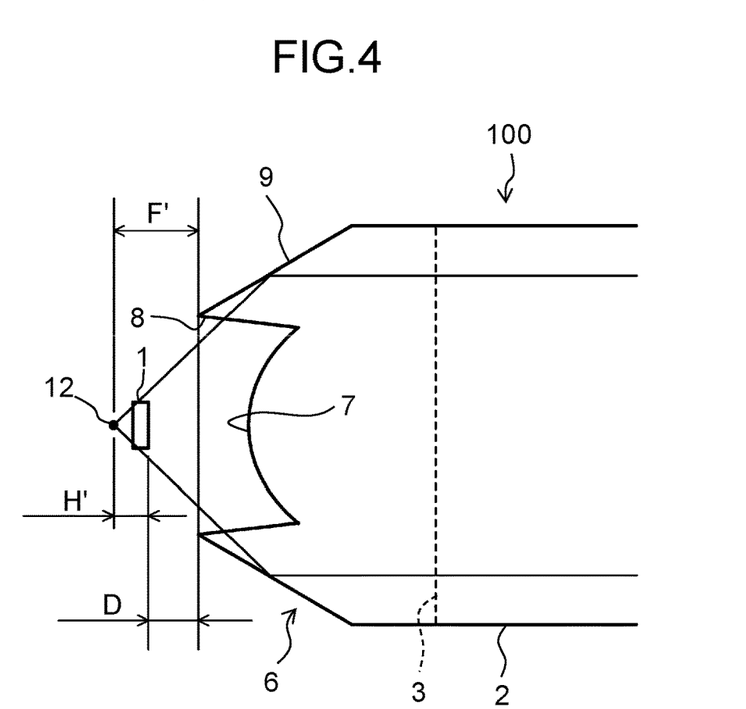
FIG. 4 is a sectional view illustrating a positional relationship between the second focal position of the first reflection surface and the light source.

FIG. 4 is a sectional view illustrating a positional relationship between the second focal position of the first reflection surface and the light source. As illustrated in FIG. 4, F' denotes a distance from the portion of light control body 6 closest to light source 1 to second focal position 12 of first reflection surface 9.

Here, in order to effectively use the light emitted from the end part of the light emission surface of light source 1, it is necessary to reduce an influence of the size of light source 1 by making the distance F' larger than the distance D. Therefore, the distance F' and the distance D are set so as to satisfy the following Expression (2).

$$D \leq F' \qquad \text{Expression (2)}$$

In addition, since the position of first incident surface 7 is closer to light source 1 than the position of first reflection surface 9 is, first incident surface 7 is more easily affected by the size of light source 1. Therefore, it is preferable that the distance F and the distance F' satisfy the following Expression (3).

$$F' \leq F \qquad \text{Expression (3)}$$

Figure 5:
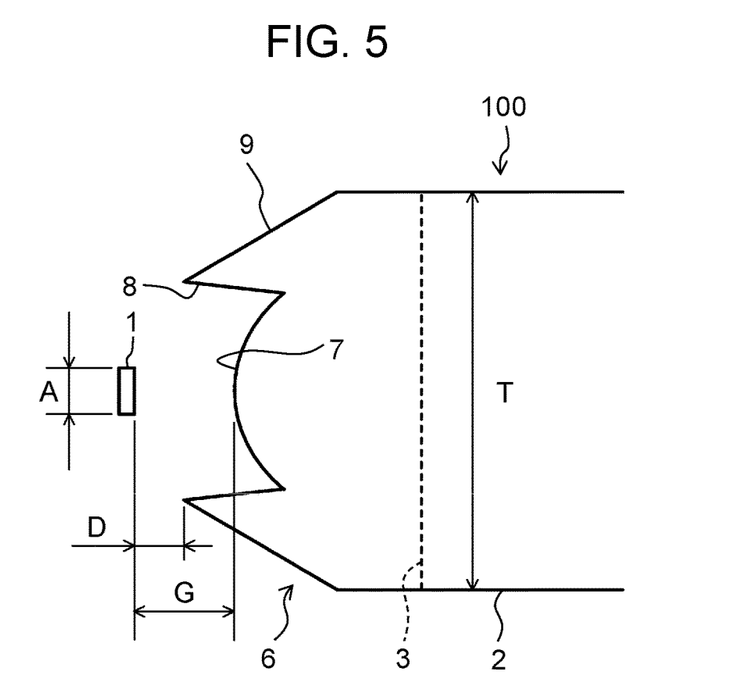
FIG. 5 is a sectional view illustrating a maximum thickness of a light guide plate, a size of the light source, and a distance from the light source to the first incident surface.

FIG. 5 is a sectional view illustrating a maximum thickness of the light guide plate, the size of the light source, and the distance from the light source to the first incident surface. As illustrated in FIG. 5, T denotes the maximum thickness of light guide plate 2. A denotes the size of light source 1.

Here, when the thickness of light guide plate 2 is increased, the influence of the size of light source 1 can be reduced, and the light can be effectively used, but the overall size of optical system 100 becomes very large. Therefore, the maximum thickness T of light guide plate 2 is set so as to satisfy the following Expression (4), preferably the following Expression (5), and more preferably the following Expression (6).

$$T/20 \le A \qquad \text{Expression (4)}$$

$$T/10 \le A \qquad \text{Expression (5)}$$

$$T/5 \le A \qquad \text{Expression (6)}$$

As illustrated in FIG. 3, H denotes the difference between the distance F and the distance D. By controlling the light emitted from light source 1, first incident surface 7 effectively irradiates first surface 4 with light. Therefore, when the distance H becomes too large, the light cannot be effectively controlled. Therefore, the distance H is set so as to satisfy the following Expression (7), preferably the following Expression (8), and more preferably the following Expression (9).

$$H \le 10A \qquad \text{Expression (7)}$$

$$H \le 5A \qquad \text{Expression (8)}$$

$$H \le A \qquad \text{Expression (9)}$$

As illustrated in FIG. 4, H' denotes the difference between the distance F and the distance D. By controlling the light emitted from light source 1, first reflection surface 9 effectively irradiates first surface 4 with light. Therefore, when the distance H' becomes too large, the light cannot be effectively controlled. Therefore, the distance H' is set so as to satisfy the following Expression (10), preferably the following Expression (11), and more preferably the following Expression (12).

$$H' \le 10A \qquad \text{Expression (10)}$$

$$H' \le 5A \qquad \text{Expression (11)}$$

$$H' \le A \qquad \text{Expression (12)}$$

As illustrated in FIG. 5, G denotes a distance from the portion of first incident surface 7 closest to light source 1 to light source 1. Here, in order to effectively control the light emitted from the end part of the light emission surface of light source 1, it can be considered to bring light source 1 closer to light control body 6.

However, if light source 1 is too close to light guide plate 2, light guide plate 2 may be melted by heat of light source 1. Therefore, it is preferable that the distance D, the size A of light source 1, and the distance G satisfy the following Expressions (13) and (14).

$$D \ge 0 \qquad \text{Expression (13)}$$

$$A \le G \qquad \text{Expression (14)}$$

Figure 6:
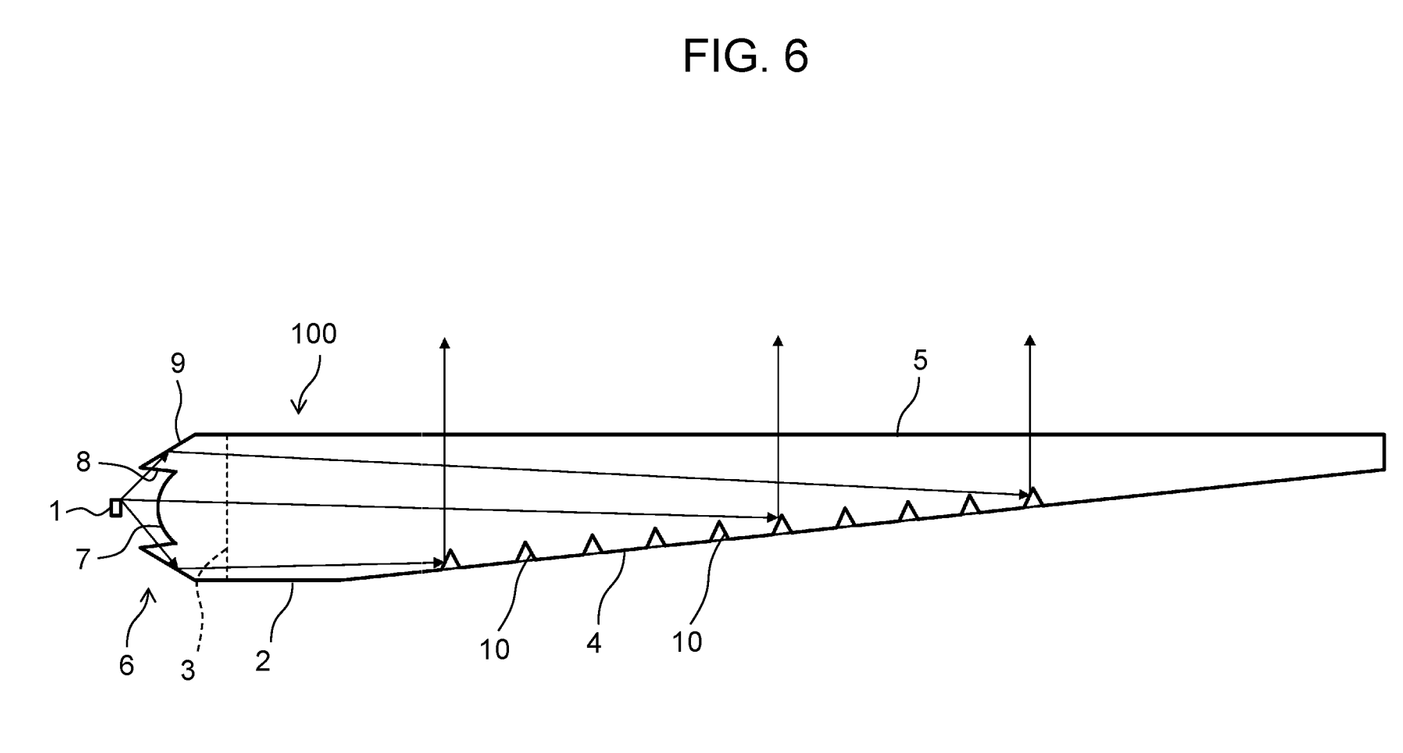
FIG. 6 is a diagram illustrating a state where light emitted from an end part of a light emission surface of the light source is controlled by a light control body, thereby causing the entire second surface of the light guide plate to surface-emit light.

Hereinafter, a light emitting principle of optical system 100 of the present embodiment will be described. First, as illustrated in FIG. 6, the divergence angle of the light emitted from light source 1 is controlled by passing through light control body 6.

The light whose divergence angle is controlled is emitted from light control body 6 toward incident surface 3 of light guide plate 2. First surface 4 is inclined so as to be closer to second surface 5 at a position that is more distant from the incident surface 3. Therefore, most of the light incident on incident surface 3 reaches first surface 4 without reaching second surface 5 or the side surface of light guide plate 2 that faces incident surface 3.

Most of the light incident on incident surface 3 is totally reflected by any one of the plurality of prisms 10 provided on first surface 4 without being reflected by first surface 4 or second surface 5.

The light totally reflected by prisms 10 traces an optical path substantially orthogonal to second surface 5 and is emitted from second surface 5. As a result, entire second surface 5 surface-emits light.

Figure 7:
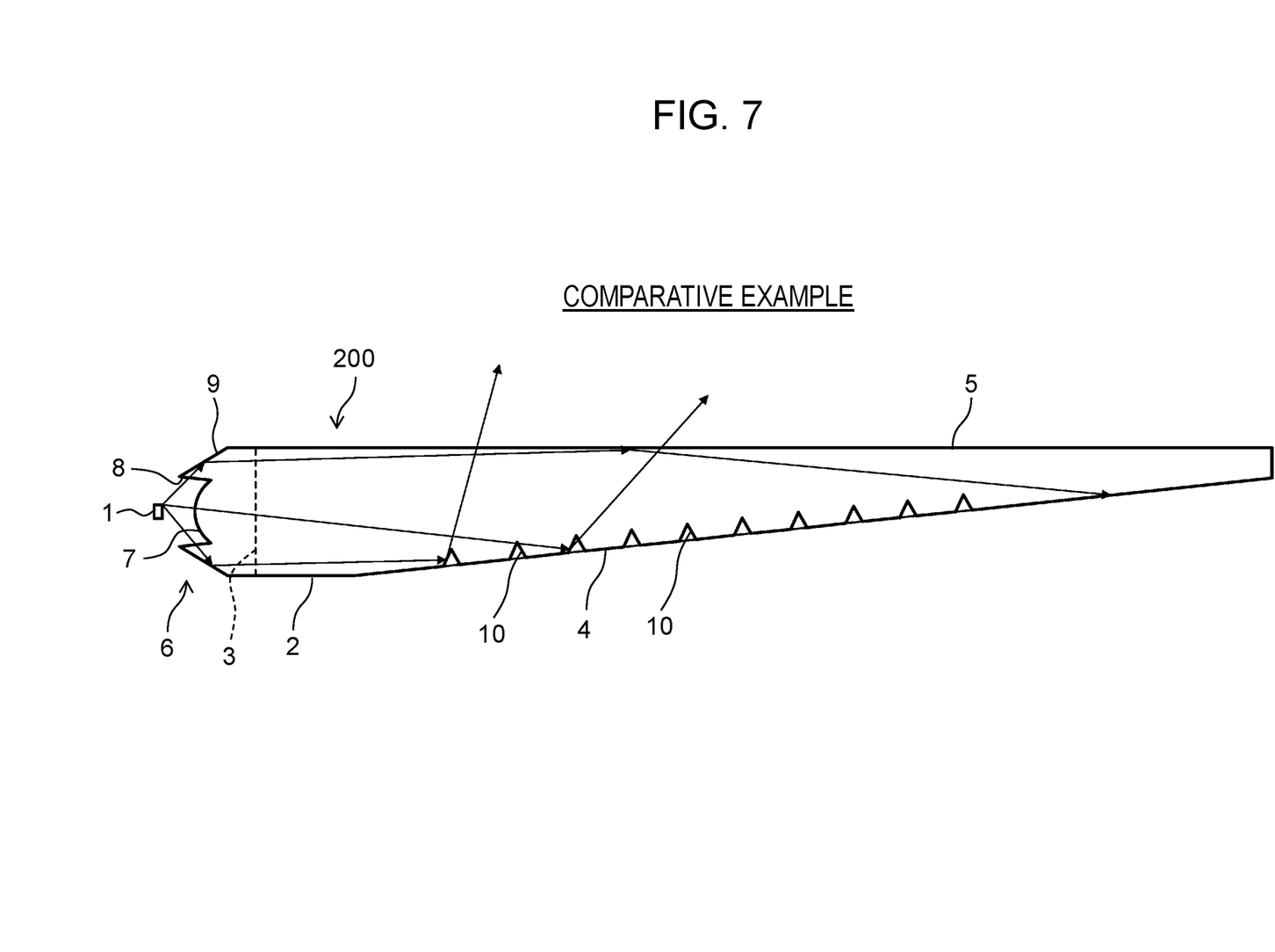
FIG. 7 is a diagram illustrating a state where light emitted from the end part of the light emission surface of the light source is not controlled by the light control body.

On the other hand, as illustrated in a comparative example of FIG. 7, in optical system 200 in which first focal position 11 of first incident surface 7 and second focal position 12 of first reflection surface 9 are matched to each other, there is a problem that the light emitted from the end part of the light emission surface of light source 1 cannot be effectively controlled.

Specifically, as illustrated in FIG. 7, part of the light incident on incident surface 3 is directed to second surface 5 without being directed to first surface 4 or the side surface of light guide plate 2. The light directed to second surface 5 can be totally reflected by second surface 5. Then, the light totally reflected by second surface 5 is directed to first surface 4, and there is a high possibility that the light leaks from first surface 4 without being reflected by prisms 10.

Hereinafter, it will be described how the light extraction efficiency changes by shifting first focal position 11 and second focal position 12 with respect to the light emission surface of light source 1.

Figure 8:
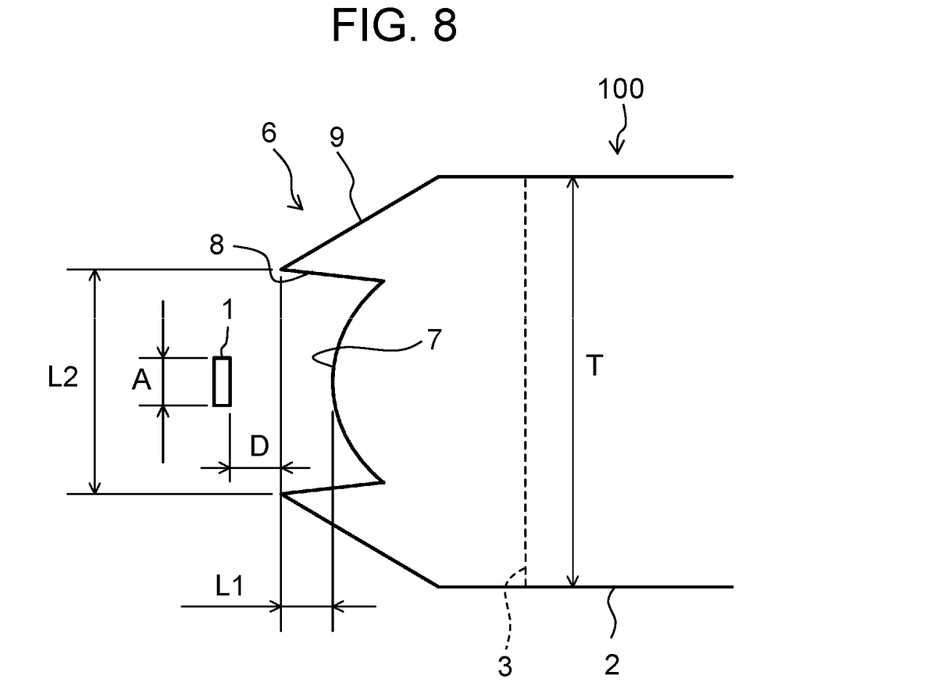
FIG. 8 is a diagram illustrating specific dimensions of the light control body and the light guide plate.

FIG. 8 is a diagram illustrating specific dimensions of the light control body and the light guide plate. As illustrated in FIG. 8, the specific dimensions are as follows: a maximum thickness T of light guide plate 2 is 8 mm, a distance L1 between the part of light control body 6 closest to light source 1 and first incident surface 7 is 1 mm, an opening width L2 of the portion of light control body 6 closest to light source 1 is 4.3 mm, a distance D is 1 mm, and a size A of light source 1 is 1 mm.

Figure 9:
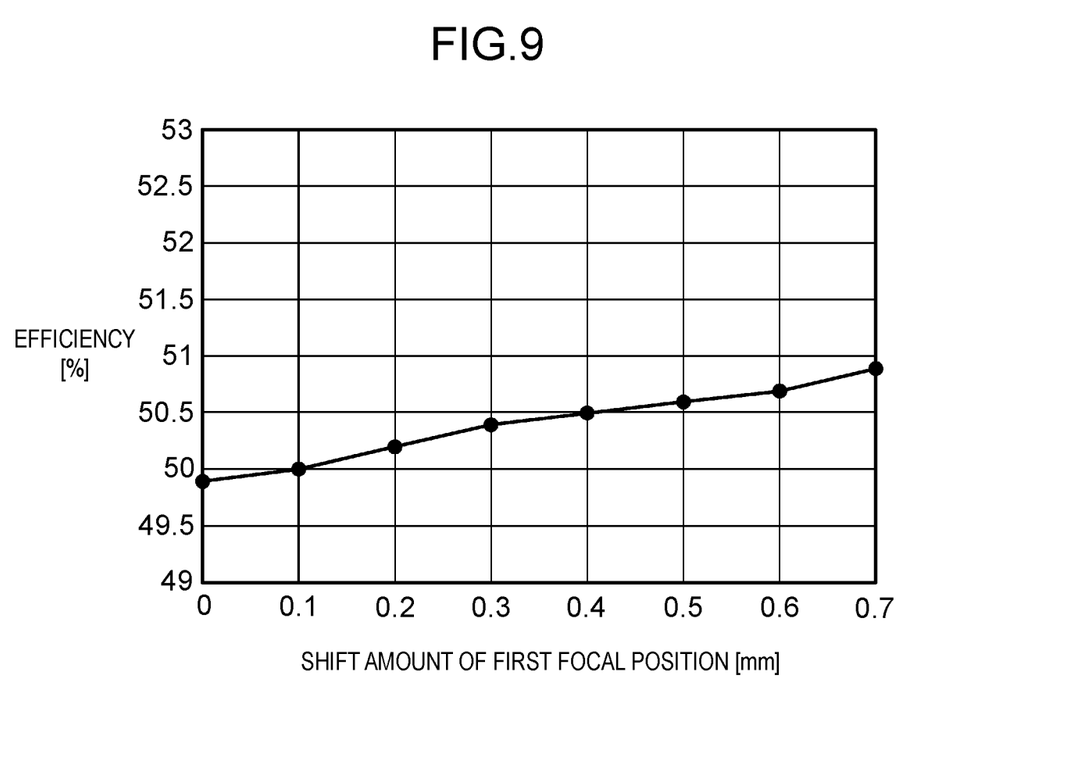
FIG. 9 is a graph diagram illustrating a relationship between a shift amount of the first focal position from the light emission surface of the light source and light extraction efficiency.

In the graph diagram illustrated in FIG. 9, the shift amount of first focal position 11 is assumed to be 0 mm when first focal position 11 is located on the light emission surface of light source 1, and first focal position 11 is shifted in a direction away from light guide plate 2.

As illustrated in FIG. 9, when the shift amount of first focal position 11 is 0 mm, the light extraction efficiency is 49.9%. Then, it can be seen that the efficiency is further improved as first focal position 11 is shifted more. In the present embodiment, the shift amount of first focal position 11 is set to 0.4 mm in consideration of a balance with other indices. In this case, the efficiency is 50.5%.

Figure 10:
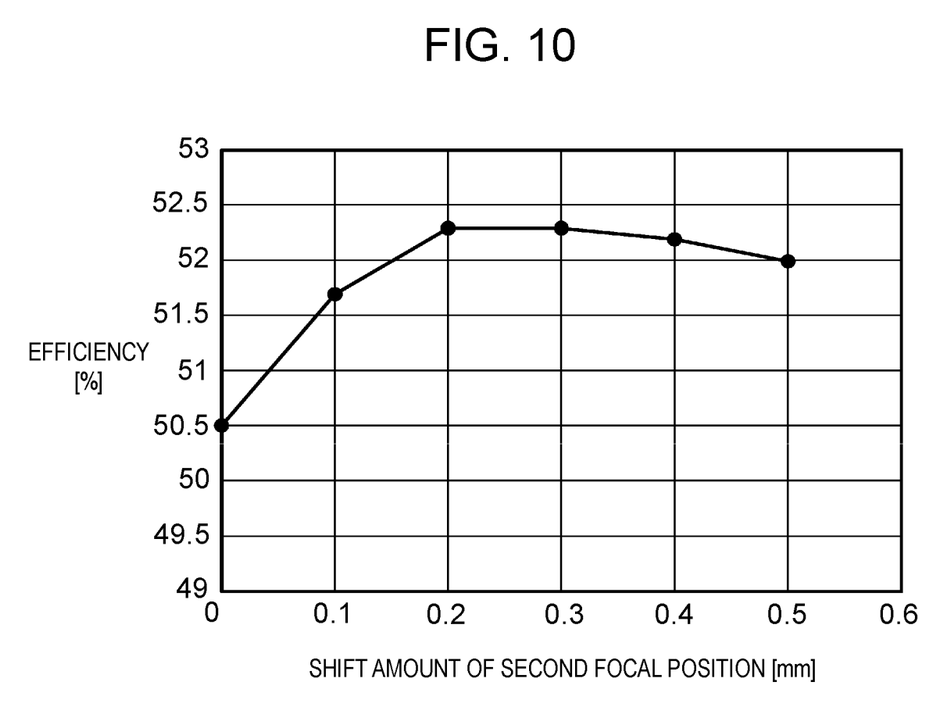
FIG. 10 is a graph diagram illustrating a relationship between a shift amount of the second focal position from the light emission surface of the light source and light extraction efficiency.

In the graph diagram illustrated in FIG. 10, the shift amount of second focal position 12 is assumed to be 0 mm when second focal position 12 is located on the light emission surface of light source 1, second focal position 12 is shifted in a direction away from light guide plate 2.

As illustrated in FIG. 10, when the shift amount of second focal position 12 is 0 mm, the light extraction efficiency is 50.5%. Then, it is shown that as second focal position 12 is shifted, the efficiency is improved until the shift amount becomes 0.3 mm but the efficiency becomes lower after that. In the present embodiment, the shift amount of second focal position 12 is set to 0.2 mm. In this case, the efficiency is 52.3%.

As described above, by setting the shift amount of first focal position 11 to 0.4 mm and the shift amount of second focal position 12 to 0.2 mm, the light extraction efficiency can be improved from the lowest value 49.9% to 52.3%.

As described above, an aspect of the present invention can improve the light extraction efficiency. Specifically, by setting the first focal position of the first incident surface and the second focal position of the first reflection surface at positions that are different from each other and away from the light emission surface of the light source, the light emitted from the end part of the light emission surface of the light source can be effectively controlled, whereby the efficiency of light extraction by the prisms can be improved.

INDUSTRIAL APPLICABILITY

As described above, the present invention is remarkably useful and has high industrial applicability since the present invention can improve a light extraction efficiency.

REFERENCE MARKS IN THE DRAWINGS

1: light source
2: light guide plate
3: incident surface
4: first surface
5: second surface
6: light control body
7: first incident surface
9: first reflection surface
10: prism
11: first focal position
12: second focal position
100: optical system

The invention claimed is:
1. An optical system comprising:
a light source that emits light;
a light guide plate including:
an incident surface that the light emitted from the light source is incident on, and a first surface and a second surface that face each other, the second surface being a light exit surface of the light guide plate; and
a light control body that condenses light directed to the incident surface and emits the condensed light toward the incident surface,
wherein the first surface is provided with a prism that reflects light passing through an inside of the light guide plate, toward the second surface,
the light control body includes:
a first incident surface that condenses part of the light emitted from the light source and emits the part of the light toward the incident surface of the light guide plate, and a first reflection surface that reflects and emits, toward the incident surface of the light guide plate, light emitted from the light source and not passing through the first incident surface,
the first incident surface has a first focal position where parallel light converges at one point when the parallel light is incident on the first incident surface of the light control body from the incident surface of the light guide plate, the first reflection surface has a second focal position where parallel light converges at one point when the parallel light is incident on the first reflection surface of the light control body from the incident surface of the light guide plate, and
the first focal position and the second focal position are set at positions that are different from each other and away from a light emission surface of the light source, wherein
a following expression is satisfied, $H \leq 5A$ where H is a distance being a difference between D and F,
F is a distance from a portion of the light control body closest to the light source to the first focal position of the first incident surface,
D is a distance from the portion of the light control body closest to the light source to the light emission surface of the light source, and
A is a size of the light source.

2. The optical system according to claim 1, wherein a following expression is satisfied, $D \leq F$ where F is a distance from a portion of the light control body closest to the light source to the first focal position of the first incident surface, and
D is a distance from the portion of the light control body closest to the light source to the light emission surface of the light source.

3. The optical system according to claim 1, wherein a following expression is satisfied, $D \leq F'$ where F' is a distance from a portion of the light control body closest to the light source to the second focal position of the first reflection surface, and
D is a distance from the portion of the light control body closest to the light source to the light emission surface of the light source.

4. The optical system according to claim 1, wherein a following expression is satisfied, $F' \leq F$ where F is a focal distance from a portion of the light control body closest to the light source to the first focal position of the first incident surface, and
F' is a distance from the portion of the light control body closest to the light source to the second focal position of the first reflection surface.

5. The optical system according to claim 1, wherein a following expression is satisfied, $T/20 \leq A$ where T is a maximum thickness of the light guide plate, and
A is a size of the light source.

6. An optical system comprising:
a light source that emits light;
a light guide plate including:
an incident surface that the light emitted from the light source is incident on, and a first surface and a second surface that face each other, the second surface being a light exit surface of the light guide plate; and
a light control body that condenses light directed to the incident surface and emits the condensed light toward the incident surface, wherein the first surface is provided with a prism that reflects light passing through an inside of the light guide plate, toward the second surface, the light control body includes:

a first incident surface that condenses part of the light emitted from the light source and emits the part of the light toward the incident surface of the light guide plate, and a first reflection surface that reflects and emits, toward the incident surface of the light guide plate, light emitted from the light source and not passing through the first incident surface, the first incident surface has a first focal position where parallel light converges at one point when the parallel light is incident on the first incident surface of the light control body from the incident surface of the light guide plate, the first reflection surface has a second focal position where parallel light converges at one point when the parallel light is incident on the first reflection surface of the light control body from the incident surface of the light guide plate, and the first focal position and the second focal position are set at positions that are different from each other and away from a light emission surface of the light source, wherein a following expression is satisfied, $$H' \leq 5A$$

where H' is a distance being a difference between D and F',

F' is a distance from a portion of the light control body closest to the light source to the second focal position of the first reflection surface, D is a distance from the portion of the light control body closest to the light source to the light emission surface of the light source, and A is a size of the light source.

* * * * *